United States Patent [19]
Woodbridge

[11] 3,783,302
[45] Jan. 1, 1974

[54] APPARATUS AND METHOD FOR CONVERTING WAVE ENERGY INTO ELECTRICAL ENERGY

[76] Inventor: David D. Woodbridge, P.O. Box 1425, Melbourne, Fla. 32901

[22] Filed: Apr. 6, 1972

[21] Appl. No.: 241,702

[52] U.S. Cl............ 290/42, 290/53, 310/15, 310/12, 310/36
[51] Int. Cl............................................. F03b 13/12
[58] Field of Search .................. 310/36, 15, 14, 12, 310/35, 27; 322/52; 290/53, 54, 42, 43

[56] References Cited
UNITED STATES PATENTS

| | | | |
|---|---|---|---|
| 2,926,313 | 2/1960 | Wiegand | 310/15 X |
| 975,157 | 11/1910 | Quedens | 290/42 |
| 3,374,409 | 3/1968 | Gorka | 310/27 X |
| 387,310 | 8/1888 | Mather | 310/27 |
| 2,409,857 | 10/1946 | Hines et al. | 310/15 |
| 3,842,688 | 7/1958 | Martin | 310/15 |

*Primary Examiner*—G. R. Simmons
*Attorney*—Duckworth & Hobby

[57] ABSTRACT

Apparatus including a coil supported on one end by a platform which reciprocates in response to wave action on a body of water. A magnetic field is provided through the coil so that an electromotive force is generated therein due to motion of the coil in the magnetic field.

14 Claims, 3 Drawing Figures

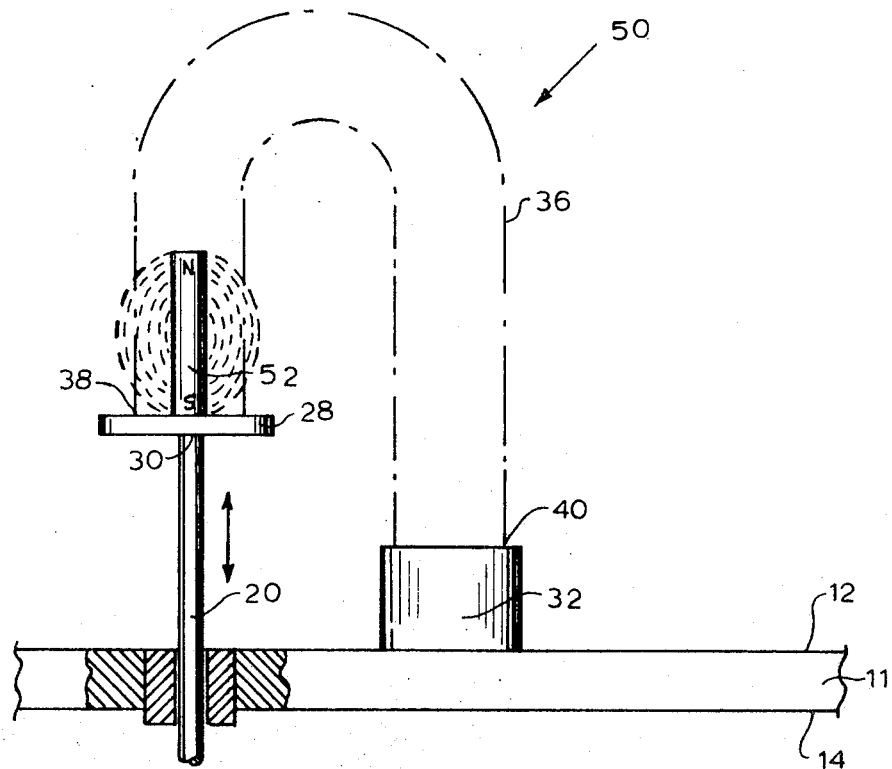
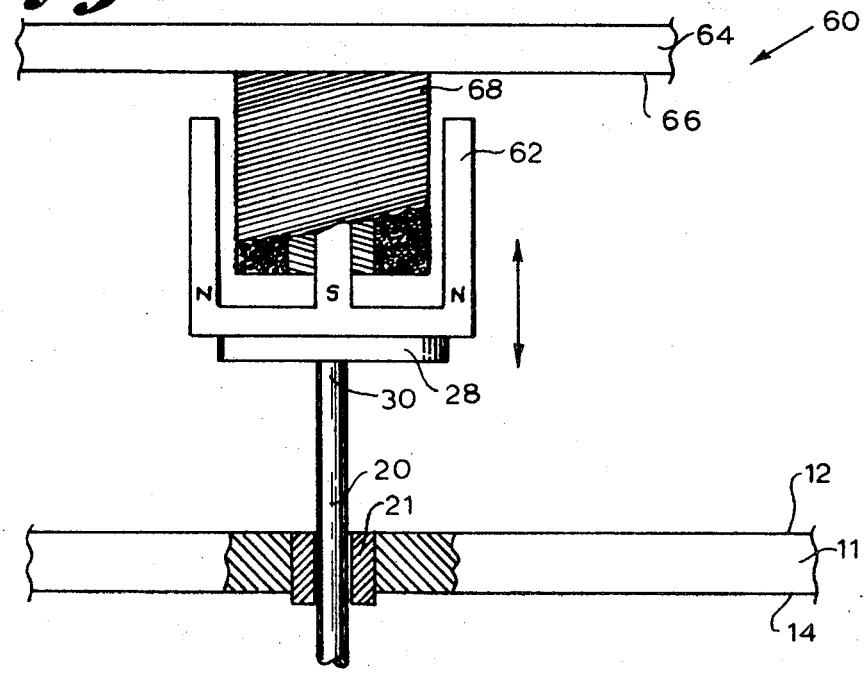

APPARATUS AND METHOD FOR CONVERTING WAVE ENERGY INTO ELECTRICAL ENERGY

BACKGROUND OF THE INVENTION

This invention relates to apparatus and methods for converting one form of energy into another, and in particular, relates to apparatus and methods for converging wave energy to electrical energy.

A variety of schemes have been devised in the prior art for converting the wave motion energy of body of water into electrical energy. One technique uses wave energy or tidal differences to raise water into a reservoir; the water in the reservoir is subsequently used to drive a turbine. See, for example, U.S. Pats. Nos. 2,668,918; 2,820,148; 2,871,790; and 3,487,228. Another scheme employs wave motion to pump or compress air or water which, in turn, drives a turbine. Examples are disclosed in U.S. Pats. Nos. 427,398; 901,117; 3,569,725; 3,064,137; and 3,200,255. A third technique utilizes the rocking motion of the waves to rotate various gear arrangements and drive an electric generator. Examples of this technique are set forth in U.S. Pats. Nos. 3,204,110 and 3,231,749. A fourth arrangement employs the horizontal element of wave motion to turn a shaft which drives a turbine. See U.S. Pats. Nos. 833,361; 988,508; and 1,289,533. A fifth scheme utilizes tidal differences to either drive a gear arrangement, or to move a series of magnets through a field of coil. See U.S. Pats. Nos. 3,011,062 and 3,567,953.

Yet another technique employs two concentric buoys, one of which is maintained in a fixed relation by an anchor, while the other buoy moves in relation to the vertical element of wave motion. A magnet is mounted on one buoy and a field coil in the other, so that the relative motion between the buoys generates an electromotive force in the coil. This technique is disclosed in U.S. Pat. No. 3,546,473 to Rich.

SUMMARY OF THE INVENTION

The invention comprises apparatus having a member supporting an expandable coil. A magnetic field is provided having flux lines which pass through the coil, so that when the coil is expanded and compressed, an electromotive force is generated therein.

BRIEF DESCRIPTION OF THE DRAWINGS

Other objects, features and advantages of this invention will be apparent from a study of the written description of the drawings, in which

FIG. 2 is a side view of a portion of a second embodiment of the invention; and

FIG. 3 is a side view of a portion of a third embodiment of the invention.

DESCRIPTION OF THE PREFERRED EMBODIMENT

Figure 1:
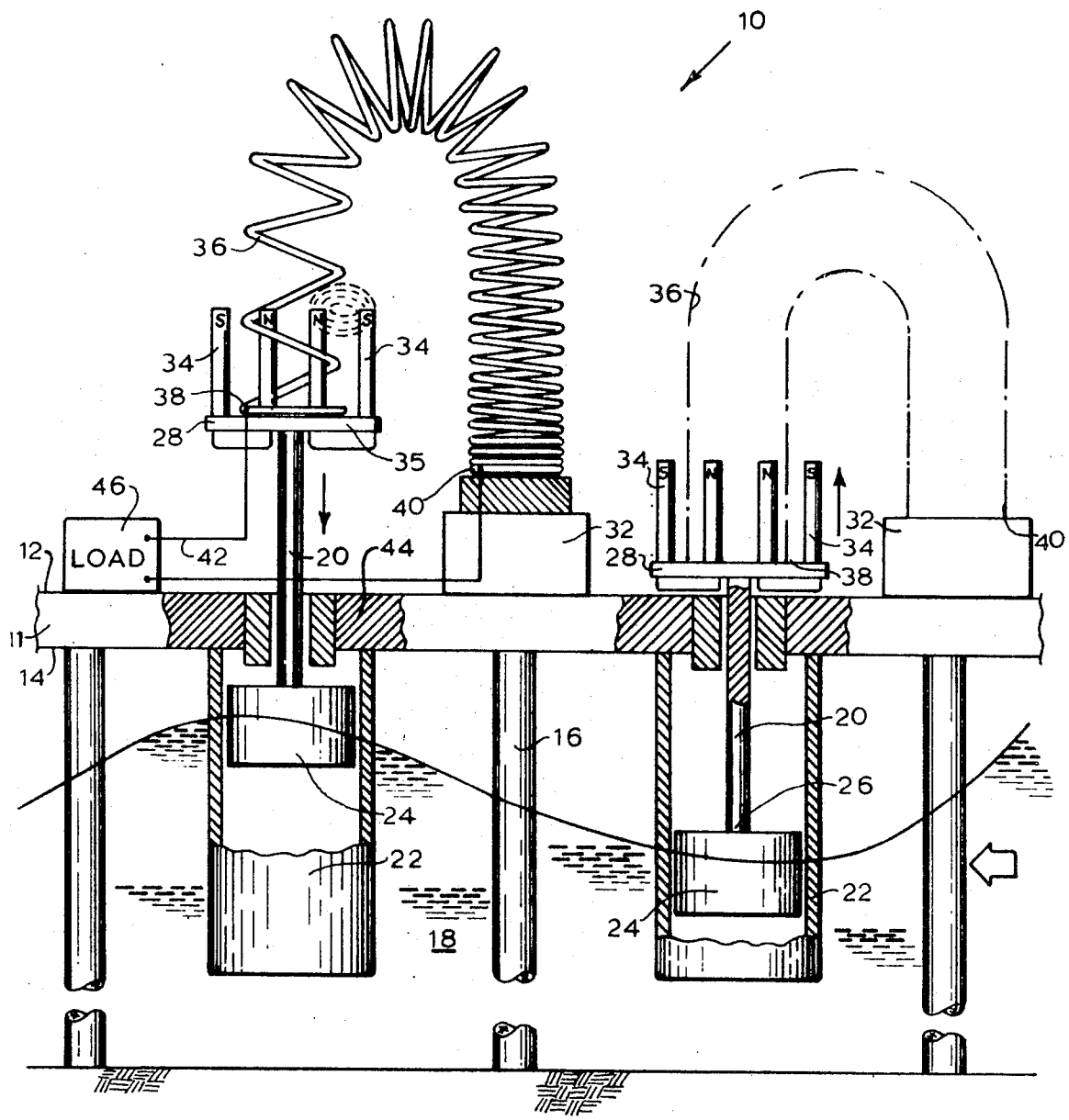
FIG. 1 is a side view, partially in schematic, of one embodiment of the present invention.

Apparatus embodying the present invention is shown in FIG. 1 and described with reference thereto. The apparatus 10 includes a base member 11 having upper and lower opposed surfaces 12 and 14, respectively. The base member 11 is supported in fixed relation to a body of water 18, as an ocean or lake, by pilings 16, with the lower surface 14 adjacent to the water. The apparatus 10 further includes several multiple platform-shaft arrangements, two of which are shown in FIG. 1. The following description relates to that arrangement on the left side of FIG. 1, it being understood that identical reference numerals and description apply to all of the other arrangements.

A shaft 20 is slideably mounted between the two surfaces 12, 14 of the base member 11 in a direction substantially normal to the body of water 18. Reciprocal motion of the shaft 20 is facilitated by a low friction slip ring 21 mounted in the base member 11 and around the shaft 20. An open-ended tube 22 is joined to the lower surface 14 and extends into the water 18 around the shaft 20. A buoyant member 24 is slideably mounted in the tube 22, and is affixed to that end 26 of the shaft 20 which extends into the tube.

A movable platform 28 is mounted on the other end 30 of the shaft 20 above the upper surface 12 of the base member 11. A fixed platform 32 is mounted on the upper surface 12 of the base member 11 in proximity to the shaft 20. Preferably, the height of the fixed platform 32 above the surface 12 is about one-half the maximum height of the movable platform 28.

A plurality of U-shaped magnets 34 are attached at the platform 28, with the north N and south S poles extending substantially normal to therefor platform. One pole (N or S) of common polarity for each magnet 34 extends toward the center of the platform 28.

An expandable, electrically conductive coil 36 is provided having two ends 38, 40 which are supported by the movable platforms 28. (The coil 36 on the right side of FIG. 1 is represented by dotted lines). Each coil end 38, 40 surrounds the centrally disposed pole (N or S) of each magnet 34, so that one pole extends into the coil 36, with the other pole extending alongside the coil. The coil 36 is of sufficient length to insure that it extends substantially normal to each platform 38, 32 at the respective coil end 38, 40.

Circuit means, such as wires 42, 44, are coupled between each coil end 38, 40 and a load 46 (for example, a storage battery).

The apparatus of FIG. 1 functions in the following manner. As waves pass underneath the base member 11, the water level in the tube 22 will commensurately rise and fall. As the water level in the tube 22 rises and falls, the buoyant member 24 and the shaft 20 reciprocate up and down in the tube. In this manner, the vertical element of wave motion is employed to empart reciprocal motion to the movable platform 28. As the platform 28 likewise moves up and down, the expandable coil 36 alternately expands and compresses at each coil end 38, 40 between the platforms 28, 32. As the coil 36 moves through the flux lines (shown at one magnet 34 in FIG. 1) between the north pole N and south pole S of each magnet 34, an electromotive force (emf) is generated in the coil 36 as given by the well-known expression:

$$e = Blv$$

where:
- $e$ = electromotive force, in volts
- $B$ = flux density
- $l$ = length of the coil segment passing through the field
- $v$ = velocity of coil segment.

The current of this electromotive force may then be conducted to the load 46 by circuit means 42, 47 coupled to the coil ends 38, 40.

A portion of a second embodiment of the invention includes apparatus 50 which is essentially similar to that previously described, except that a bar magnet 52 is mounted normal to the platform 28, instead of the U-shaped magnet 34 of FIG. 1. The bar magnet 52 may also comprise either an electromagnet or a permanent magnet; however, a permanent magnet is shown in FIG. 2. As the coil 36 (shown by dotted lines) expands and compresses through the flux lines of each bar magnet 52, an emf is generated in the coil. These flux lines are illustrated, for example, at the bar magnet 52 mounted on the movable platform 28.

A portion of a third embodiment of the invention is shown in FIG. 3. This embodiment includes apparatus 60 which is similar to the apparatus 10 of FIG. 1, and also includes a base member 11, a shaft 20 therethrough, and a movable platform 28 mounted on the upper shaft end 30. The apparatus 60 also includes a buoyant member and a tube as described above and which are not shown in FIG. 3.

The apparatus 60 further includes a magnet 62 which preferably has a central pole E and two outer poles N. Alternatively, a U-shaped magnet such as the magnet 34 of FIG. 1 may be used. It will be understood that the poles of the magnet 62 can be reversed.

The apparatus 60 also includes a support member 64 having a surface 66 which opposes the movable platform 28. The support member 64, which is cut away in FIG. 3, may comprise a cover for the apparatus 60. A field coil 68, haivng a plurality of turns, is mounted on the surface 66 and is juxtaposed over the magnet 62 so that the central pole S will enter the coil when the movable platform 28 rises in response to wave action. In the embodiment of FIG. 3, it is necessary that the outer poles N of the magnet 62 be spaced from the central pole S a distance greater than the outside dimension of the coil 68.

In the apparatus 60, an electromotive force is generated in the coil 68 as the magnet 62 moves in and out of the coil 68 in response to wave action. This emf is given by Faraday's Law:

$$e = -N \, d\phi/dt$$

where:

$e$ = electromotive force, in volts
$N$ = number of coil turns
$d\phi/dt$ = time rate of change of magnetic flux linking the N turns.

In an alternate arrangement of the apparatus 60 of FIG. 3, the magnet 62 is mounted on the surface 66 of the support member 64, and the field coil 68 is mounted on the movable platform 28.

Various other arrangements of the three embodiments set out above are possible. For example, in the embodiment of FIG. 1, a support member like member 64 in FIG. 3 may be employed to support the expanded coil 36 over the movable platform 28.

I claim:

1. Energy conversion apparatus, comprising:
   an expandable, electrically conductive coil having an end supported by said platform;
   means for providing a magnetic field having flux lines which pass through said coil; and
   means for expanding and compressing said coil responsive to wave action on a fluid body, such that said coil is moved by said platform in said magnetic field to produce an electromotive force through said coil.

2. Apparatus as recited in claim 1, wherein said magnetic field means comprises at least one magnet carried by said platform.

3. Apparatus as recited in claim 2, wherein said magnet comprises one pole extending substantially normal to said platform and into said coil, and another pole of a polarity opposite to said one pole extending alongside said coil and substantially parallel to said one pole.

4. Apparatus as recited in claim 2, wherein said magnet comprises a bar magnet extending substantially normal to said platform with one pole of said magnet being adjacent to said platform.

5. Apparatus as recited in claim 2, wherein said coil expansion and compression means comprises:
   means for maintaining another end of said coil in fixed relation; and
   means for moving said platform in response to wave action on a fluid body.

6. Apparatus as recited in claim 5, wherein said platform moving means comprises:
   a base member supported in a fixed relation above said fluid body;
   a shaft slideably mounted through said base member and substantially normal to said fluid body;
   a buoyant member affixed to one of said shaft and supported by said fluid body; and wherein
   said platform is mounted on the other end of said shaft.

7. Apparatus as recited in claim 6, wherein said means for maintaining said another coil end in fixed relation comprises means mounted on said base member.

8. Apparatus as recited in claim 6, further comprising a tube mounted on said base member and surrounding said buoyant member and said shaft.

9. Energy conversion apparatus, comprising:
   a. a base member supported in fixed relation above a fluid body;
   b. a shaft extending through said base member and substantially normal to said fluid body;
   c. a buoyant member affixed to one end of said shaft and supported by said fluid body;
   d. a platform mounted on the other end of said shaft;
   e. an electrically conductive coil comprising a plurality of turns;
   f. a magnet having a magnetic field with flux lines which pass through said coil;
   g. one of said coil and said magnet being carried by said platform; and wherein
   h. said shaft and platform reciprocate in response to wave action on said fluid body, causing said flux lines to be moved along said coil and generate an electromotive force therein.

10. Apparatus as recited in claim 9, wherein said coil comprises an expandable coil having one end carried by said platform and another end supported in fixed relation thereto.

11. Apparatus as recited in claim 10, further comprising said magnet carried by said platform.

12. Apparatus as recited in claim 9, wherein said magnet is carried by said platform, further comprising: a support member having a surface; said coil mounted on said surface and juxtaposed over said magnet, so that when said platform reciprocates in response to wave action, said magnet moves into said coil to generate said electromotive force.

13. Apparatus for converting wave energy to electrical energy, comprising:
   a. a base member having two opposed surfaces;
   b. means for supporting said base member with a first one of said surfaces adjacent and in fixed relation to a body of water;
   c. a shaft slideably mounted between said two surfaces in a direction substantially normal to said body of water;
   d. a tube mounted on said first surface and extending into said water about said shaft;
   e. a buoyant member slidably mounted within said tube and affixed to one end of said shaft;
   f. a movable platform on the other end of said shaft;
   g. a fixed platform on the other end of said shaft;
   h. an expandable, electrically conductive coil comprising a plurality of turns and having two ends, each of said ends being supported by one of said platforms; and
   i. at least one magnet mounted on each of said platforms, one pole of said magnet extending normal to said platform and into said coil and the other pole extending alongside said coil and substantially parallel to said other pole, the pole orientation being reversed on one of said platform relative to the other platform.

14. An energy conversion method, comprising the steps of:
   providing a magnetic field;
   providing an expandable coil; and
   expanding and comprising said coil responsive to wave action on a fluid body such that said coil is moved in said magnetic field to generate an electromotive force therein.

* * * * *